United States Patent [19]

Vassallo

[11] Patent Number: 5,309,713
[45] Date of Patent: May 10, 1994

[54] COMPRESSED GAS ENGINE AND METHOD OF OPERATING SAME

[76] Inventor: Franklin A. Vassallo, 1273 Ransom Rd., Lancaster, N.Y. 14086

[21] Appl. No.: 879,846

[22] Filed: May 6, 1992

[51] Int. Cl.⁵ ............................................. F16D 31/02
[52] U.S. Cl. ...................................... 60/370; 91/303; 91/325
[58] Field of Search ................. 60/370, 371, 374; 91/281, 303, 319, 325; 417/501, 520

[56] References Cited

U.S. PATENT DOCUMENTS

| | | | |
|---|---|---|---|
| 692,799 | 6/1900 | Soley | 91/303 |
| 1,264,856 | 7/1914 | Power | 91/281 |
| 3,079,900 | 3/1963 | Hunnicutt | 91/303 |
| 3,299,968 | 1/1967 | Cunningham | 91/303 |
| 3,668,974 | 6/1972 | Hagdorn et al. | 91/325 X |
| 3,726,185 | 4/1973 | Orr | 91/303 X |
| 3,910,160 | 10/1975 | Divine | 91/325 X |
| 4,074,612 | 2/1978 | Miller | 91/303 X |

*Primary Examiner*—Edward K. Look
*Assistant Examiner*—Hoang Nguyen
*Attorney, Agent, or Firm*—Sommer, Oliverio & Sommer

[57] ABSTRACT

A compressed gas engine (20) has a piston (25) mounted for reciprocating movement within a cylinder (22). A valve (29) is slideably mounted on the cylinder head (31) to control the flow of compressed gas from a source (24) through an inlet (23) to a plenum chamber (28). The valve is arranged to be selectively engaged and opened by the piston to permit flow of compressed gas into the plenum chamber. When the valve is closed, compressed gas within the plenum chamber is permitted to flow into the variable-volume chamber (26). Spent gases are exhausted through ports (69) as the piston approaches its bottom dead center position. Residual gases in the variable-volume chamber are recompressed into the plenum chamber (28) as the piston moves upwardly toward its top dead center position.

10 Claims, 3 Drawing Sheets

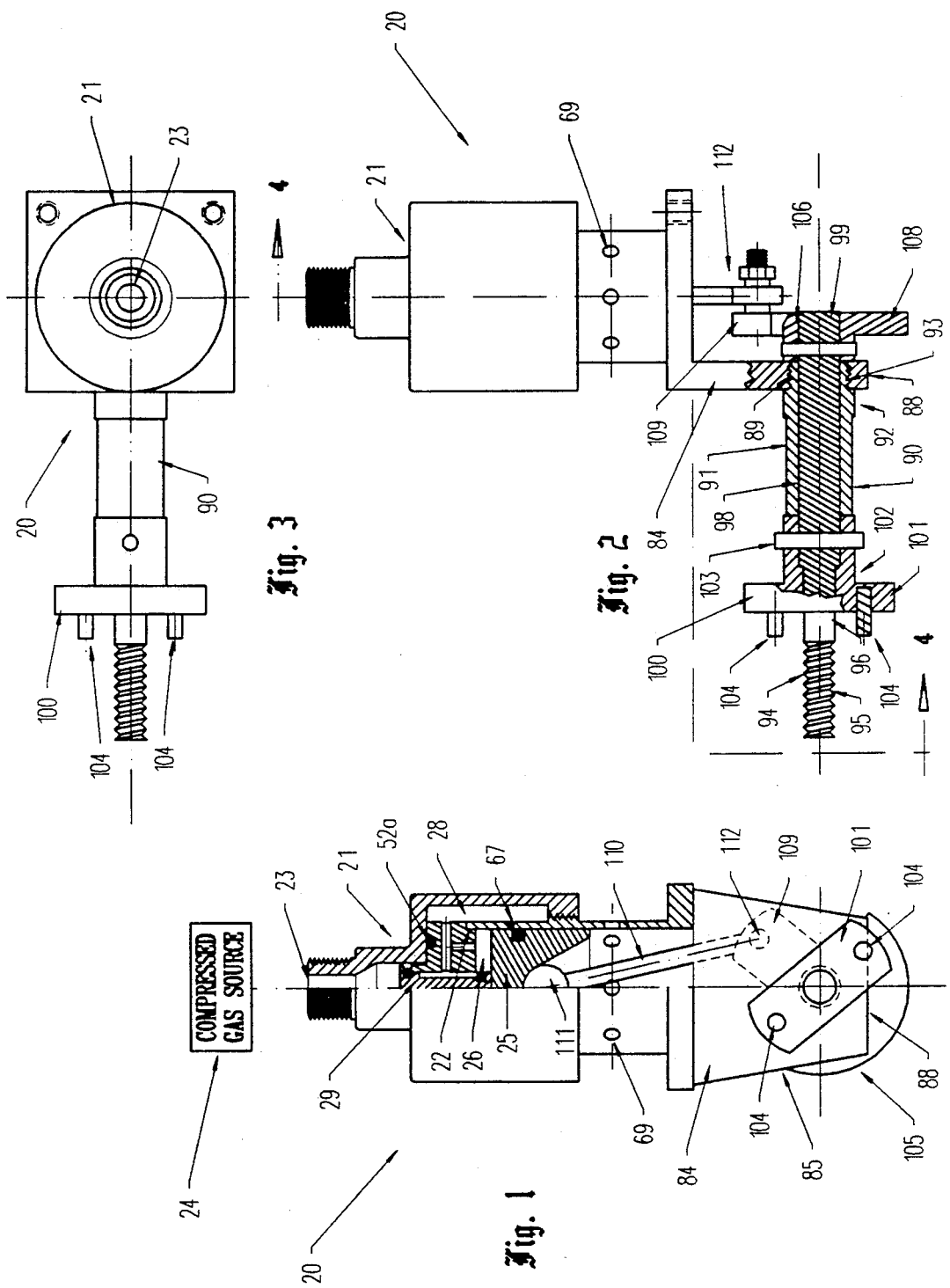

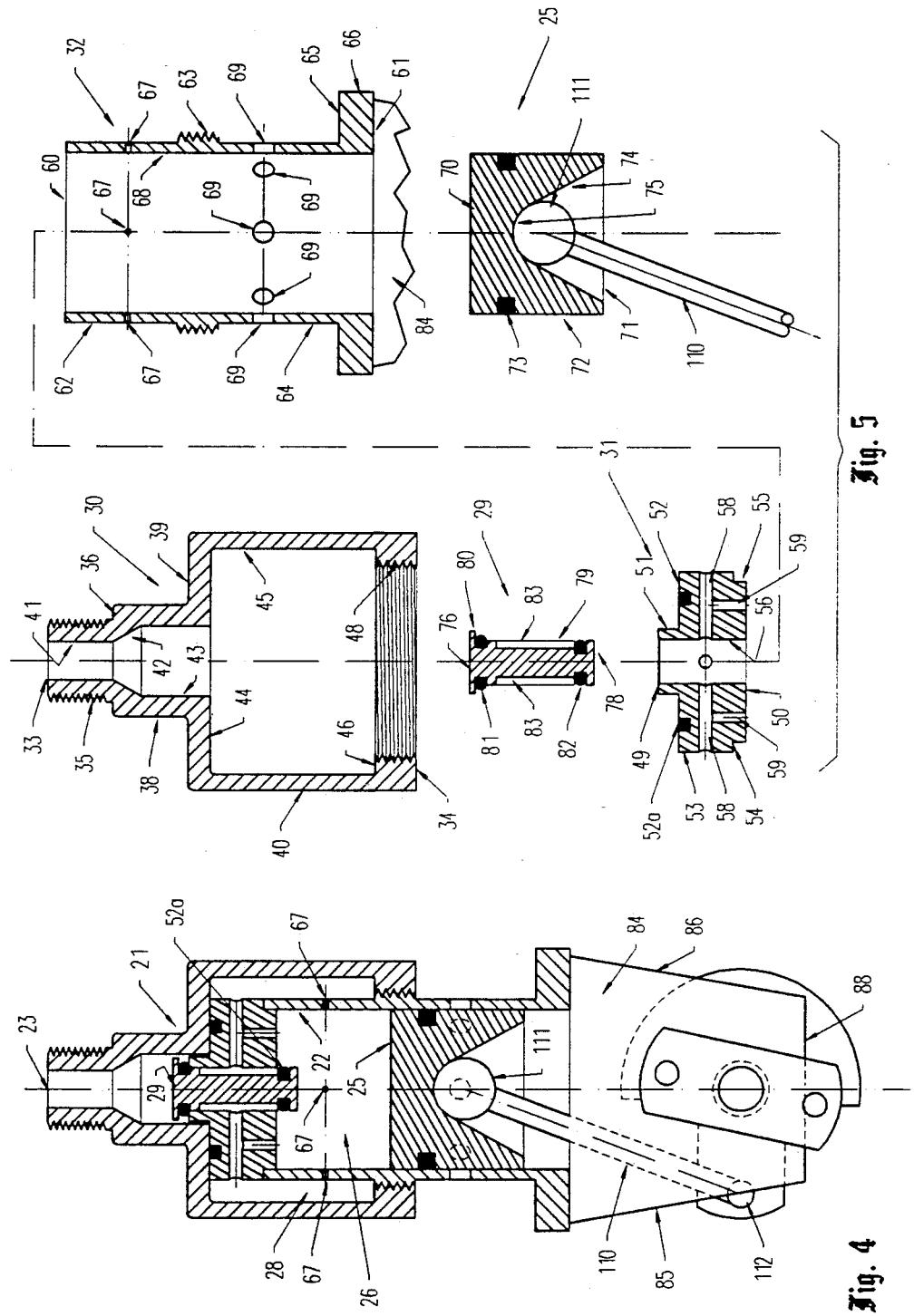

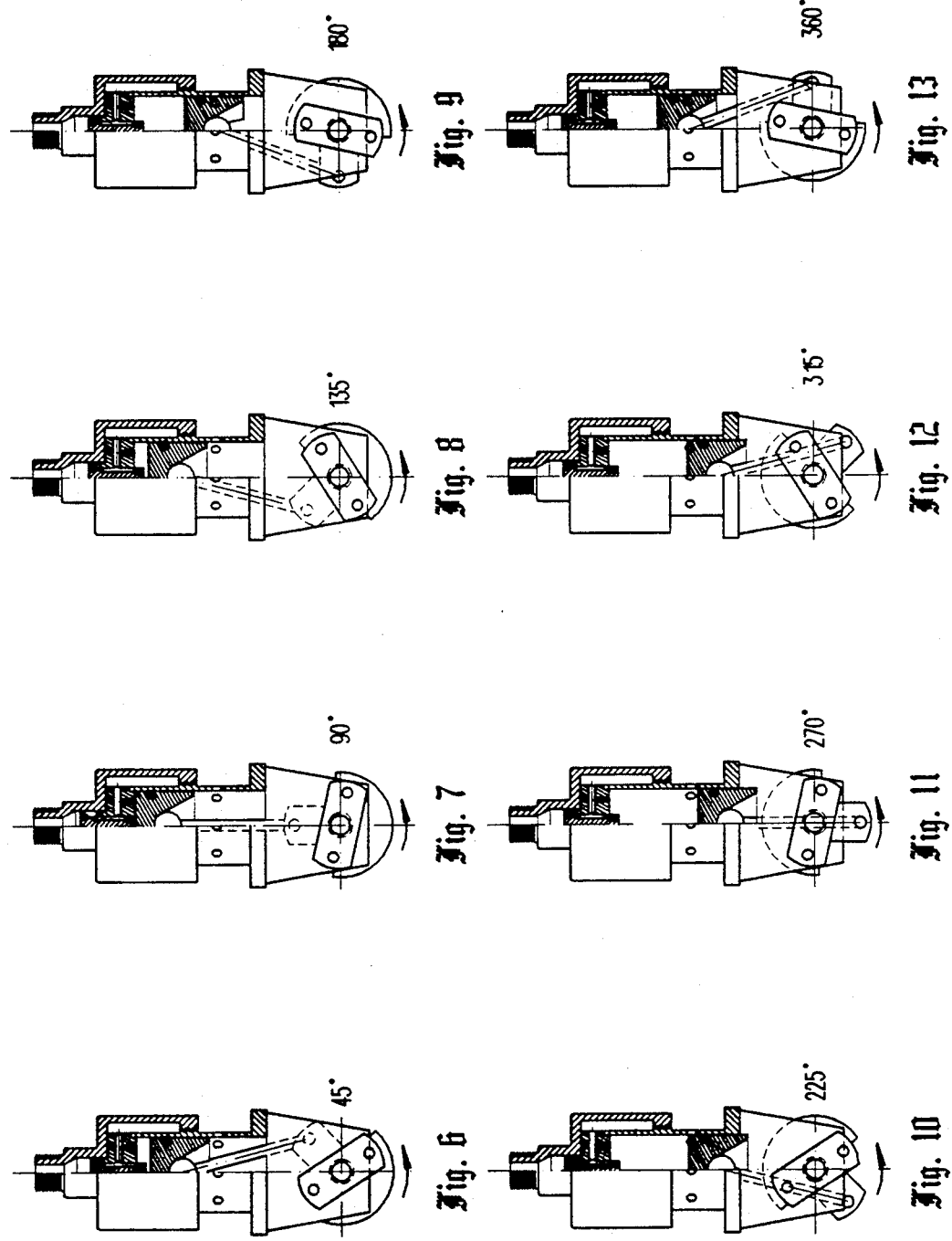

COMPRESSED GAS ENGINE AND METHOD OF OPERATING SAME

TECHNICAL FIELD

The present invention relates generally to a compressed gas engine, and, more particularly, to an improved compressed gas engine in which gas leakage through and about a valve by means of which compressed gas is introduced into a variable-volume chamber, is reduced and the effects of gas recompression on the piston return stroke are reduced.

BACKGROUND ART

Compressed gas engines are, of course, known. These somewhat resemble a conventional internal combustion engine in that they typically have a piston mounted for reciprocating movement within a cylinder. Compressed gas from a suitable source is arranged to be selectively admitted into the chamber, to expand the volume of same, and to drive the piston downwardly toward its bottom dead center position. When the piston approaches the downward limit of its power stroke, gas within the chamber is selectively vented. Various types of prior art compressed gas engines are shown and described in Pond, *Expansion Engine Powered Model Aircraft*, AMA-915, SAM-376.

In prior art compressed gas engines, particularly those of simple design, there was a problem with the sealing integrity of valves used to selectively admit compressed gas from the source to the chamber. The principal problem was such valves were accompanied by substantial leakage, which reduced the overall efficiency of the engine. Furthermore, scavenging of spent residual gases in the cylinder, needed in prior art designs to obtain power efficiency, adds complexity and reduces gas use efficiency.

The present invention provides an improved gas engine which overcomes these problems in the prior art by providing an improved valve with positive sealing features to control the selective admission of gas into the variable-volume chamber, and which provides for reduction in recompression effects during the piston return stroke.

DISCLOSURE OF THE INVENTION

The present invention provides an improved compressed gas engine and method of operating same.

With parenthetical reference to the corresponding parts, portions or surfaces of the disclosed embodiment, merely for purposes of illustration and not by way of limitation, the invention provides, in one aspect, an improved compressed gas engine (20) which is adapted to be associated with a source (24) of compressed gas. The improved engine broadly comprises: a body (21) having a cylinder (22) and having an inlet (23) adapted to receive compressed gas from the source; a piston (25) mounted for reciprocating movement within the cylinder and defining a variable-volume chamber (26) therewithin; a plenum chamber (28) on the cylinder and communicating with the variable-volume chamber; and a valve (29) mounted on the body for controlling the flow of compressed gas with respect to the plenum chamber, this valve being movable between a closed position (i.e., as shown in FIGS. 6 and 8-10) at which the valve prevents fluid flow between the inlet and the plenum chamber and an open position (i.e., as shown in FIG. 7) at which the valve permits fluid flow from the inlet to the plenum chamber, the valve being biased toward its closed position and being arranged to be selectively engaged by the piston and moved to its open position when the piston is in its top dead center position.

In another aspect, the invention provides an improved method of operating a compressed gas engine of the type heretofore described. This method broadly includes the steps of: causing the piston to abut the valve as the piston approaches its top dead center position; progressively opening the valve as the piston moves closer to its top dead center position to permit compressed gas to flow from the inlet to the plenum chamber; progressively closing the valve as the piston moves past its top dead center position to progressively reduce the flow of compressed gas to the plenum chamber; causing the piston to separate from the valve to prevent further flow between the inlet and the plenum chamber; causing gas to flow from the plenum chamber into the variable-volume chamber as the piston moves toward its bottom dead center position; and venting gas from the variable-volume chamber as the piston moves closer to its bottom dead center position.

Accordingly, the general object of this invention is to provide an improved compressed gas engine.

Another object is to provide an improved compressed gas engine in which leakage of the pressurized gas is reduced, with a concomitant increase in the overall efficiency of the engine.

Another object is to provide an improved compressed gas engine in which the flow of compressed gas from a source into a variable-volume chamber is controlled more precisely than in prior art engines.

Another object is to provide an improved method of operating a compressed gas engine.

These and other objects and advantages will become apparent from the foregoing and ongoing written specification, the drawings, and the appended claims.

BRIEF DESCRIPTION OF THE DRAWINGS

FIG. 1 is a vertical view, partly in elevation and partly in section, of a schematic form of the improved compressed gas engine.

FIG. 2 is a right side view, again partly in section and partly in elevation, of the compressed gas engine shown in FIG. 1.

FIG. 3 is a top plan view of the engine shown in FIG. 2.

FIG. 4 is an enlarged fragmentary vertical sectional view thereof, taken generally on line 4—4 of FIG. 2, this view showing the piston as being positioned intermediate its top dead center and bottom dead center positions and further showing the valve as being closed to prevent fluid flow from the inlet to the plenum chamber.

FIG. 5 is an exploded view of the body, valve and piston shown in FIG. 4.

FIG. 6 is a view, generally similar to FIG. 1, showing the position of the piston when the crankshaft is in its 45° position.

FIG. 7 is a view, generally similar to FIG. 6, showing the position of the piston when the crankshaft is in its 90° position.

FIG. 8 is a view, generally similar to FIG. 6, showing the position of the piston when the crankshaft is in its 135° position.

FIG. 9 is a view, generally similar to FIG. 6, showing the position of the piston when the crankshaft is in its 180° position.

FIG. 10 is a view, generally similar to FIG. 6, showing the position of the piston when the crankshaft is in its 225° position.

FIG. 11 is a view, generally similar to FIG. 6, showing the position of the piston when the crankshaft is in its 270° position.

FIG. 12 is a view, generally similar to FIG. 6, showing the position of the piston when the crankshaft is in its 315° position.

FIG. 13 is a view, generally similar to FIG. 6, showing the position of the piston when the crankshaft is in its 360° position.

DESCRIPTION OF THE PREFERRED EMBODIMENT(S)

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIGS. 1-5 thereof, the present invention provides an improved compressed gas engine, of which a presently-preferred embodiment is schematically indicated at 20. Engine 20 is shown as broadly including an assembled body 21 having a cylinder 22 and having an inlet 23 adapted to receive compressed gas from a source, schematically indicated at 24 in FIG. 1, a piston 25 mounted for reciprocating movement within the cylinder and defining a variable-volume chamber 26 therewithin, a plenum chamber 28 mounted on the cylinder so as to surround the cylinder and communicating with chamber 26, and a valve 29 mounted on the cylinder for controlling the flow of compressed gas with respect to the plenum.

Body 21 is an assembly of three separate parts: an upper part 30, an intermediate part 31, and a lower part 32. As best shown in FIG. 5, body upper part 30 is depicted as being a vertically-elongated specially-configured tubular member having annular horizontal upper and lower end faces 33,34, respectively. The outer surface is shown as sequentially including an externally-threaded portion 35 extending downwardly from the outer margin of upper end face 33, and upwardly-facing annular horizontal surface 36, a vertical cylindrical surface 38, an upwardly-facing annular horizontal surface 39, and a vertical cylindrical surface 40 continuing downwardly therefrom to join the outer margin of lower end face 34. The inner surface of the body upper part is stepped, and sequentially includes an inwardly-facing vertical cylindrical surface 41 extending downwardly from the inner margin of upper end face 33, a downwardly- and inwardly-facing frusto-conical surface 42, a vertical cylindrical surface 43, a downwardly-facing annular horizontal surface 44, a vertical cylindrical surface 45, an upwardly-facing annular horizontal surface 46, and an internally-threaded portion 48 continuing downwardly therefrom to join the inner margin of lower end face 34.

Body intermediate part 31 forms the head for cylinder 22. Body intermediate part 31 is depicted as being a vertically-elongated specially-configured member having annular upper and lower horizontal end faces 49,50, respectively. The outer surface of intermediate part 31 is stepped, and sequentially includes a vertical cylindrical surface 51 extending downwardly from the outer margin of upper end face 49, an upwardly-facing annular horizontal surface 52, a vertical cylindrical surface 53, a downwardly-facing annular horizontal surface 54, and a vertical cylindrical surface 55 continuing downwardly therefrom to join the outer margin of lower end face 50. An annular groove extends downwardly into body intermediate part surface 52, to receive and accommodate an O-ring 52a which seals the joint between surfaces 52 and 44. The body intermediate part is provided with a vertical through-bore bounded by inwardly-facing vertical cylindrical surface 56. A plurality of radial holes, severally indicated at 58, communicate bore wall 56 with outer surface 53. In the preferred embodiment, there are four such holes 58, and these are arranged at equidistant angles of about 90°. A corresponding plurality of vertical holes, severally indicated at 59, are drilled upwardly from lower end face 50 so as to intersect a corresponding one of radial holes 58.

Body lower part 32 is shown as being a vertically-elongated tubular member having annular upper and lower horizontal end faces 60,61, respectively. The outer surface of lower part 32 includes a vertical cylindrical surface 62 extending downwardly from the outer margin of upper end face 60, an externally-threaded portion 63, a vertical cylindrical surface 64, an upwardly-facing annular horizontal surface 65, and a vertical cylindrical surface 66 continuing downwardly therefrom to join the outer margin of lower end face 61. The inner surface of lower part 32 is bounded by a vertical cylindrical surface 68. A plurality of angularly-spaced radial holes, severally indicated at 67, commensurate inner surface 68 with outer surface 62. There are four such holes, arranged at equal 90° intervals. Another plurality of angularly-spaced radial holes, severally indicated at 69, communicate inner surface 68 with outer surface 64. There are eight such holes, arranged at equidistant angles of 45°.

Piston 25 is depicted as being a vertically-elongated specially-configured member having a circular horizontal upper end face 70, and an annular horizontal lower end face 71. A vertical cylindrical outer surface 72 extends between the outer margins of the upper and lower end faces. An annular groove extends radially into the piston from side wall surface 72 to receive and accommodate the presence of an O-ring 73 by which the piston may be mounted for sealed sliding movement within body lower part cylinder 22. A concave recess extends axial upwardly into the piston from its lower end face 71. More particularly, this recess is bounded by an inwardly- and downwardly-facing frusto-conical surface 74 extending upwardly from the inner margin of lower end face 71, and a downwardly-facing concave spherically-segmented surface 75, the lower margin of which tangentially joins the upper margin of surface 74.

Still referring principally to FIG. 5, valve 29 is shown as being a vertically-elongated specially-configured member having circular horizontal upper and lower end faces 76, 78, respectively. Valve 29 has a cylindrical outer surface 79 extending upwardly from the outer margin of its lower end face to join an outturned annular flange portion 80 immediately adjacent upper end face 76. An annular groove extends radially into valve 29 from surface 79 immediately below flange portion 80 to receive and accommodate an O-ring 81. Another annular groove extends radially into the valve from surface 79 adjacent lower end face 78 to receive and accommodate a second O-ring 82. A plurality of longitudinally-extending flutes or recesses, severally indicated at 83, extend radially into the valve member from outer surface 79 so as to be positioned between O-rings 81, 82. In the preferred embodiment, these flutes or recesses may be formed by machining flats into the valve from its cylindrical outer surface 79 of the valve member. The valve member is mounted on the body intermediate part, as shown in FIG. 4, with O-rings 79, 80 providing cushioned stops for vertical movement of the valve member relative to the body intermediate part.

As shown in FIGS. 1, 2, 4 and 5, an integral vertical plate portion, generally indicated at 84 extends downwardly from one marginal end portion of body lower part 32. This plate-like member is in the form of an isosceles trapezoid, and has convergent planer left and right side surfaces 85, 86, respectively and a lower horizontal narrow bottom surface 88. As best shown in FIG. 2, trapezoidal portion 84 is provided with a tapped horizontal through-hole 89. A horizontally-elongated tubular sleeve bearing, generally indicated at 90 is mounted on plate-like portion 84. More particularly, bearing 90 is shown as having annular vertical left and right end faces, and a stepped outer surface which includes horizontal cylindrical surface 91, a polygonal surface 92, and an internally-threaded portion 93 continuing rightwardly therefrom to join the right end face of the bearing sleeve. A horizontally-elongated shaft, generally indicated at 94, is shown as penetrating the sleeve bearing. More particularly, this shaft is shown as having, in pertinent part, a leftward externally-threaded marginal end portion 95, a horizontal cylindrical surface 96, a leftwardly-facing annular vertical surface, and a horizontal cylindrical surface 98 continuing rightwardly therefrom to join the right end face 99 of the shaft.

In the embodiment shown, a spinner, generally indicated at 100 is mounted on an intermediate portion of the shaft. As best shown in FIGS. 1 and 2, spinner 100 has a plate-like portion 101, and has a tubular collar 102 extending rightwardly therefrom so as to embrace a portion of the shaft. The spinner is fixedly mounted to the shaft by means of a diametrical pin 103. As best shown in FIG. 1, the left end face of the spinner appears to be somewhat configured as an elongated rectangle, in which the shorter sides thereof are arcuate. A pair of blind holes extend rightwardly into the spinner from diametrically-opposite locations thereon, to receive and accommodate pins 104 by means of which the output shaft may be coupled to some other object (not shown), such as a propeller, mounted thereon.

A flywheel member, generally indicated at 105 is mounted on the right marginal end portion of the shaft. This member is depicted as having a central horizontally-elongated tubular hub portion 106, from which a crescent-shaped counterbalancing flywheel portion 108 extends. A crank arm 109 extends radially outwardly from the axis of shaft 98 in a direction generally normal to the chordal dimension of the flywheel portion.

A connecting rod 110 operatively connects the piston with the distal marginal end portion of the crank arm. As best shown in FIG. 4, connecting rod 110 is an elongated cylindrical rod-like element provided with a spherical ball 111 at its upper end. Ball 111 is adapted to be received in spherically-segmented recess 75 of the piston. The lower marginal end portion of the connecting rod is pivotally connected, as indicated at 112 to the outboard marginal end portion of the crank arm. Thus, reciprocating movement of the piston within cylinder 22 is transmitted via rod 110 to flywheel member 105, to produce rotational movement of shaft 98 within bearing 90.

The device is assembled as shown in the drawings. More particularly, the body upper, intermediate and lower parts are assembled to together to form a cylinder 22 with an annular plenum chamber 28 thereabout. Plenum chamber 28 communicates with valve member grooves or flutes 83 via cylinder head radial passages 58. The plenum chamber also communicates with the variable-volume chamber 26 via cylinder head vertical passageways 59. Valve member 29 is mounted on the cylinder head for upward and downward movement between limits defined by O-rings 81, 82. Fluid flowing from the source and entering the engine via inlet 23 will normally bias the valve member to move downwardly relative to the cylinder head. In such position, upper O-ring 81 will sealingly engage the cylinder head at the intersection of surfaces 49, 56, to prevent flow from the source into the plenum chamber. When the piston moves upwardly and begins to approach its top dead center position, the piston upper surface 70 will engage the valve member lower surface 78 such that further upward movement of the piston within the cylinder will displace valve member 29 upwardly, thereby causing upper O-ring 81 to separate from the cylinder valve but causing lower O-ring 82 to sealingly engage the cylinder head between surfaces 50, 56. In such "open" position of the valve, fluid may flow from the source around now-separated upper O-ring 81, to enter the flutes or grooves 83, and then flow radially outwardly via radial passages 58 to enter the plenum chamber. Such flow of compressed gas past cylinder head vertical passageways 59 tends to act as an eductor or aspirator, to cause an entrained flow of fluid from variable-volume chamber 26 into the plenum chamber. This happens as the piston continues its upward motion. Ultimately, when the piston moves past its top dead center position and begins to move downwardly, the valve member 29 moves downwardly a corresponding distance until such time as upper O-ring 81 sealingly engages the cylinder head. As the flow from the source into the plenum chamber is progressively throttled, a variable orifice between lower O-ring 82 and the cylinder head begins to open. Hence, fluid in plenum chamber 28 may flow via vertical orifices 59 and the now-uncovered lower orifice between O-ring 82 and the cylinder head, to enter chamber 26, and drive the piston downwardly. Such downward motion causes corresponding rotation of the shaft. The plenum chamber therefor acts as an accumulator to receive compressed air supplied from the source as the piston approaches its top dead center position, and to discharge its pressurized contents into chamber 26 after piston 25 begins to move downwardly. Valve member 29 is biased to its normally-closed position, so as to preclude flow from the source to the plenum chamber. However, the valve member is mechanically opened by the piston as the piston approaches its top dead center position, to selectively admit fluid from the source to the plenum chamber. The improved engine offers improved control of the valving, and improved sealing. More particularly, this improved valving reduces the amount of leakage, and therefore increases the overall efficiency of the engine. The plenum also provides for storage of recompressed gases during the upward piston return stroke, thus minimizing pressure increase, recompression work, and gas use.

The operation of the engine is comparatively shown in FIGS. 6–13. These various drawing figures illustrate the position of the flywheel member, the connecting rod, the piston and the valve member at various angular positions of the shaft. In FIG. 6, the shaft is shown as being at a 45° position, with the piston moving upwardly toward its top dead center position. FIG. 6 therefor, depicts the valve as being closed, with the piston about to engage the same.

FIG. 7 depicts the piston as having moved upwardly from the position shown in FIG. 6 and as being in its top dead center position. In this position, the piston is shown as having displaced the valve member upwardly so as to admit pressurized fluid from the inlet to the plenum chamber.

FIG. 8 depicts the piston as having begun to move downwardly, this depicting the flywheel member in a 135° position. FIG. 8 also depicts the piston as having separated from the valve member, such that the flow of fluid from the source will cause the valve member to close, permitting fluid to enter the variable-volume chamber to act on the piston. At this position, the piston is about to uncover ports 67.

FIG. 9 depicts the piston as having moved downwardly, and shows the flywheel member as being in a 180° position.

FIG. 10 depicts the flywheel member as being in its 225° position, and shows the piston as having moved further downwardly so as to just uncover portions of exhaust port 69.

FIG. 11 depicts the flywheel member as being in its 270° position, this showing the piston as being in its bottom dead center position and as having uncovered exhaust port 69 so as to permit pressurized gas within chamber 26 to vent to the atmosphere.

FIG. 12 depicts the flywheel member in its 315° position, and shows the piston as moving upwardly within the cylinder so as to just cover exhaust port 69.

FIG. 13 depicts the flywheel portion as being in its 360° position, and shows the piston as having moved further upwardly, recompressing residual chamber gases into the plenum 28. Therefore, the invention provides an improved compressed gas engine, which engine broadly comprises an assembled body having a cylinder and having an inlet adapted to receive compressed gas from a source; a piston mounted for reciprocating movement within the cylinder and defining a variable-volume chamber therewithin; a plenum chamber on, and preferably surrounding, the cylinder, and communicating with the variable-volume chamber; and a valve mounted on the cylinder for controlling the flow of compressed gas with respect to the plenum chamber. This valve is adapted to be moved between a closed position, at which the valve prevents fluid flow between the inlet and the plenum chamber and an open position at which the valve permits fluid flow from the inlet to the plenum chamber. The valve is biased towards its closed position and is arranged to be selectively engaged by the piston and moved to its open position when the piston is in its top dead center position.

Modifications

The present invention contemplates that many changes and modifications may be made. For example, the engine may be used with any source of compressed gas. While this contemplates, in the first instance, that such gas might be compressed air, it should be clearly understood that other types of gases may be substituted therefor.

Secondly, the shape and configuration of the various parts and components may be readily changed or modified, as desired. While the body is shown as being of sectional construction, it may alternatively be of integral construction as well. Similarly, the structure of the valve member may be changed, as well as the output shaft and bearings therefor. While the invention is deemed to have particular application for use as a compressed gas model airplane engine, it should be clearly understood that this end use is merely illustrative, and that the scope of the invention claimed herein is not limited to this end use.

Therefore, while a preferred embodiment of the improved compressed gas engine has been shown and described, and several modifications and changes thereof discussed, persons skilled in this art will readily appreciate that various additional changes and modifications may be made without departing from the spirit of the invention, as defined and differentiated by the following claims.

What is claimed is:

1. A compressed gas engine adapted to be associated with a source of compressed gas, said engine comprising:

a body having a cylinder and having an inlet adapted to receive compressed gas from said source;

a piston mounted for reciprocating movement within said cylinder and defining a variable-volume chamber;

a plenum chamber on said cylinder and means for continuously communicating said plenum chamber with said variable-volume chamber; and a valve mounted on said body for controlling the flow of compressed gas with respect to said plenum, said valve being moveable between a closed position at which said valve prevents fluid flow between said inlet and said plenum and an open position at which said valve permits fluid flow from said inlet to said plenum, said valve being biased to move toward said closed position and being arranged to be selectively engaged by said piston and moved to its open position when said piston is in its top dead center position, said valve communicating said plenum chamber with said variable-volume chamber in said closed position and effectively preventing flow to said variable-volume chamber in said open position.

2. A compressed gas engine as set forth in claim 1 wherein said body includes a cylinder head, and wherein said valve is mounted on said cylinder head.

3. A compressed gas engine as set forth in claim 2 wherein said valve is biased toward said closed position by the pressure of said compressed gas.

4. A compressed gas engine as set forth in claim 2 wherein said cylinder head has a through-bore communicating said inlet with said variable-volume chamber, and wherein said valve is slideably arranged in said through-bore.

5. A compressed gas engine as set forth in claim 4 wherein said valve has a first end and a second end, first sealing means for sealing said first end to said body when said valve is in said closed position, and second sealing means for sealing said second end to said body when said valve is in said opened position.

6. A compressed gas engine as set forth in claim 5, and further comprising a first passageway communicating said plenum chamber with an intermediate portion of said valve member intermediate said first and second sealing means.

7. A compressed gas engine as set forth in claim 6 and further comprising a second passageway communicating said first passageway with said variable-volume chamber.

8. A compressed gas engine as set forth in claim 1 and further comprising a plurality of ports provided in said body and arranged to vent said variable-volume chamber when said piston is in its bottom dead center position.

9. A compressed gas engine as set forth in claim 1 and further comprising a crank shaft mounted on said body, said crank shaft having a crank arm, and a connecting rod operatively joining said piston and crank arm such that reciprocating movement of said piston will produce rotational movement of said crank shaft.

10. The method of operating a compressed gas engine including a body having a cylinder and having an inlet adapted to be supplied with pressurized gas from a suitable source, including a piston mounted for reciprocating movement within said cylinder and defining a variable-volume chamber, including a plenum chamber on said body and continuously communicating with said variable-volume chamber, and including a valve mounted on said body so as to control the flow of fluid with respect to said plenum chamber, which method comprises the steps of:

causing said piston to abut said valve as said piston approaches its top dead center position;

opening said valve as said piston moves closer to its top dead center position to permit a flow of compressed gas from the source into the plenum;

closing said valve as said piston moves past its top dead center position to progressively reduce the flow of compressed gas into said plenum chamber;

causing said piston to separate from said valve to prevent further flow between said source and plenum chamber;

causing gas to flow from said plenum chamber into said variable-volume chamber as said piston moves toward its bottom dead center position; and venting gas from said variable-volume chamber as said piston moves closer to said bottom dead center position.

* * * * *